Oct. 27, 1964 J. T. McNANEY 3,154,700

PIEZOELECTRIC TRANSDUCER FORCE TO MOTION CONVERTER

Filed Jan. 9, 1961

INVENTOR.

Joseph T. McNaney

United States Patent Office 3,154,700
Patented Oct. 27, 1964

3,154,700

PIEZOELECTRIC TRANSDUCER FORCE TO MOTION CONVERTER

Joseph T. McNaney, San Diego County, Calif.
(8548 Boulder Drive, La Mesa, Calif.)

Filed Jan. 9, 1961, Ser. No. 81,561
3 Claims. (Cl. 310—8.3)

This invention relates to piezoelectric transducers of the type that provide force and motion in response to applied electrical potentials but is related more directly to apparatus used in combination therewith for converting some of the force provided into additional motion.

Piezoelectric transducers have reached a state of development where they are now capable of providing output motion at very high rates of speed in response to applied electrical potentials, against exceptionally large external restraining forces. However, the magnitude of the motion is relatively small.

It is an object of this invention, therefore, to convert some of the available force from a piezoelectric transducer into motion.

A further object is to selectively control the conversion of force to motion of a combination of piezoelectric transducers.

Still another object of the invention is to convert binary coded input commands to decimal force and motion output effects.

Figure 1:
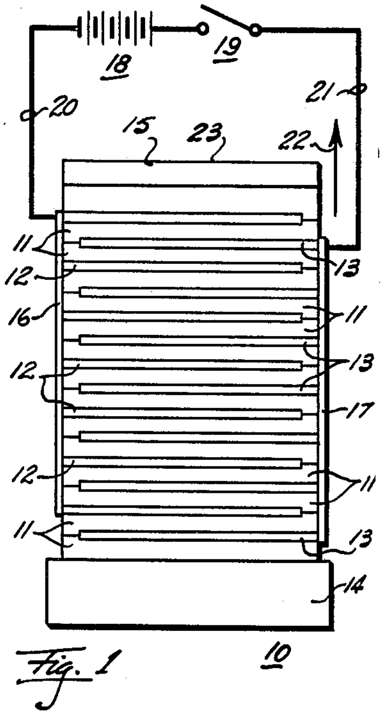
FIGURE 1 is a diagram of a piezoelectric transducer.

Referring to FIGURE 1, the piezoelectric transducer unit 10 shown is an example of the type of transducer to which this invention may be adapted, and therefore, the type of transducer that will be described in conjunction with the invention. The polarizable materials of devices such as these include ferro-electric ceramics prepared from a modified barium titinate and is available in the form of flat plates. The transducer unit 10 is comprised of a stack of these ceramic plates 11, layers of conductive material 12 and 13, a base 14 and an output member 15, bonded together to form a compact assembly of the parts. The plates 11 are approximately 0.005″ thick, and the conductive layers 12 and 13 are approximately 0.005″ thick. The layers 12 are electrically connected by a conductor 16 and the layers 13 are electrically connected by a conductor 17. The connections to layers 12 and 13 are so arranged that a potential may be applied across each of the plates. A source of potential 18 may be connected to the conductors 16 and 17 through a switch 19 and leads 20 and 21. When the switch is closed the potential 18 will be applied across the individual plates 11, causing each plate to expand in a direction parallel to the applied electrical field and thereby causing the complete stack of plates to expand as a unit. With respect to the base 14, the output member 15 will move in the direction of the arrow 22. The surface 23 of the output member 15 is normal to the axial motion imparted to the output member 15.

When a plate 11 having a thickness of 0.005″ is subjected to a field of 300 volts, its thickness will be increased $3\times10^{-6}$ inches. Due to this extremely small change it is necessary to combine large numbers of these plates in the form of stacks so that the small change per plate may be added together and thereby provide a more useful overall change. A stack of 100 plates, for example, will provide a change equal to 0.0003″. The more important characteristics of the piezoelectric transducer, however, particularly of the type referred to in this application, are in its ability to provide movements of this magnitude at relatively high rates of speed and under relatively large external load or pressure conditions. Their response is governed primarily by the RC time constant of the voltage source to which it is connected and the mechanical stress limitations of the ceramic plates. An RC time constant of $200\times10^{-6}$ second, against a load which is equal to 2500 pounds per square inch, is well within the stress tolerance of the type of transducer referred to in FIGURE 1.

Figure 2:
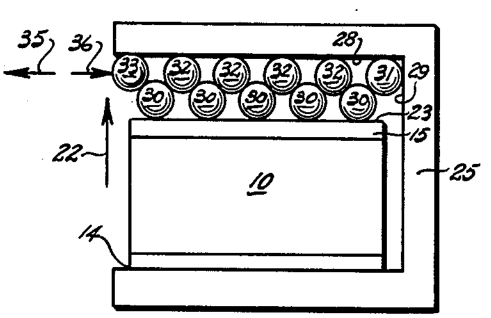

Referring now to one of the embodiments of the invention shown in FIGURE 2, a piezoelectric transducer unit 10, which is intended to be of the type described in conjunction with FIGURE 1, is supported in a stationary frame member 25 with its base 14 in a fixed position so that an associate output member 15 will be allowed to move in the direction of the arrow 22 when the unit 10 is energized in accordance with the description given of FIGURE 1. The output member 15 has a surface 23 which is normal to an axial motion imparted to the member 15. The stationary member 25 has a surface 28 which is parallel to the surface 23, but in an opposed spaced apart relation thereto. In this position, the surface 28 will also be normal to an axial motion imparted to the output member 15. Intermediate the surfaces 23 and 28 there is a series of bearings 30, 31, 32 and 33 adjoining one another in a zig-zag side-by-side arrangement, whereby bearings 30 are respectively adjacent to the surface 23 of the output member 15, and bearings 31, 32 and 33 are respectively adjacent to the surface 28 of the stationary member 25. The bearing 31 in the series is also adjacent to a base surface 29 of the stationary member 25. In the latter position the bearing 31 serves as a fixed reference member in its relation to the remaining bearings in the series.

Under a unit 10 de-energized condition the output member 15 will be in what may be termed as an initial position. Under a unit 10 energized condition the output member 15 will be in what may be termed as a final position. When the transducer unit 10 is energized, force and motion will be imparted to the output member 15 and thereby moving the latter from an initial position to a final position. The zig-zag side-by-side arrangement of the bearings 30, 31, 32 and 33 is directly related to positions of the output member 15. Intermediate the initial and final positions of the output member 15 the angular deviations of the bearings from a straight line course will be, as one example, 45°, which is the angle directly related to the particular zig-zag course of the bearings 30, 31, 32 and 33. This angle will also be directly related to the position of the output bearing 33 relative to the reference bearing 31 position. When the output member 15 is in an initial position the angular deviations of the bearings 31 to 33 from a straight line will be greater than 45°, and when the output member 15 is in a final position the angular deviations referred to will be less than 45°. Since the position of the output bearing 33 is also related to these angular deviations the latter will be greater than 45° when the bearing 33 is in an initial position and less than 45° when the bearing 33 is in a final position.

A review of the events that take place in response to an energized transducer unit 10 can be stated as follows: (1) force and motion will be imparted to an associate output member 15, causing the latter to be moved a predetermined amount from an initial position to a final position, (2) the zig-zag side-by-side course of the bearings 30 to 33 will be altered to an extent that their angular deviations from a straight line course will have been changed from an angle, for example, of 55° to an angle, for example, 35°, and (3) the output bearing 33 will be moved from an initial position to a final position. When the zig-zag side-by-side course of the bearings has been altered as stated the bearings 30 will be moved in the direction of arrow 22, and the bearings in the course, with respect to the reference bearing 31, will be moved in the direction of arrow 35. The movement of the bearings in the latter direction will be in accordance with a progressional pattern of movements.

When motion is imparted to the bearings 30, in the direction of arrow 22, the displacement of the bearing 33, in the direction of arrow 35, will be a function of a decrease in the angular deviations of the bearings 30 to 33, as indicated above, and also a function of the angle from which the decrease in the angular deviations are made. For example, if the angle from which the decrease is made is more than 45° and the angular deviations, following the decrease, is not less than 45°, then, for the movement of each bearing 30, in the direction of arrow 22, there will be more than a 2:1 movement of the output bearing 33. Since there are five bearings 30 in the series of bearings 31 to 33 of FIGURE 2, there will be an overall gain of more than ten times the motion imparted to the output member 15. However, if the angle from which the decrease is made is 45°, then, for the movement of each bearing 30, in the direction of arrow 22, there will be a movement of the output bearing 33 of less than 2:1, and an overall gain of less than ten. To exemplify still further, if the angle from which the decrease in the angular deviations is made is 60°, and the angle of the deviations following the decrease is 30°, then, for the movement of each bearing 30, in the direction of arrow 22, there will be an average of 2:1 in the movement of the output bearing 33 in the direction of arrow 35. The decrease in the angular deviation from 60° to 45° will provide an average gain of 2½:1, and the decrease in the angular deviation from 45° to 30° will provide an average gain of 1½:1. Under these conditions there will be an overall gain of ten for the series of bearings 31 to 33. Any increase in the number of bearings as illustrated, of course, will provide an increase in the overall gain accordingly.

Figure 3:
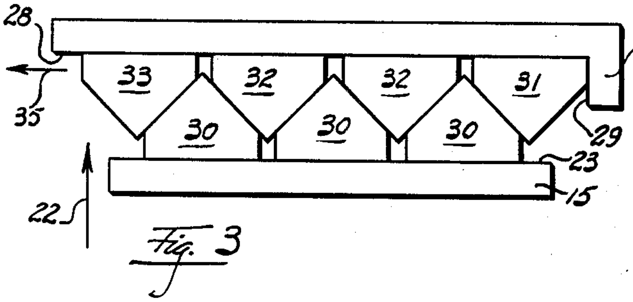
FIGURE 3 is a detail which relates to the various embodiments.

In the above description of the invention the word "bearing" has been used relative to the series of bearings 30, 31, 32 and 33. In view of the description these bearings may be understood as being ball bearings, or roller bearings. In fact, they may be of almost any size and shape. With reference to FIGURE 3, a series of bearings 30, 31, 32 and 33 is shown wherein each bearing is provided with several flat surfaces. Bearings of these configurations may be arranged in a zig-zag side-by-side adjacency whereby they are also selectively adjacent to the other surfaces 23, 28 and 29 of the assembly. Force and motion imparted to the output member 15 in the direction of the arrow 22 will alter the zig-zag course of the series of bearings and thereby impart force and motion to bearings 30, 32 and 33 in the direction of the arrow 35 with reference to the fixed bearing 31. Also in the above description of the invention the bearing 31 is referred to and used as a reference bearing adjacent to surfaces 28 and 29 of the stationary frame member 25. Without departing from the invention the bearing 31 may be an inseparable part of the frame member 25.

In the forgoing discussion it has been noted that transducers of the type described are capable of providing a force of 2500 pounds per square inch. Relative to this force capability, however, the available motion is microscopically small. In view of the smallness of the motion almost any form of mechanical backlash between the transducer 10 and the output bearing 33 would be detrimental to an otherwise satisfactory converter. An external force, therefore, is exerted in the direction of the arrow 36 against the output bearing 33. Although this external force is small in relation to the driving force of the transducer unit 10, it must be of sufficient strength to maintain a backlash-free system by returning the various elements to their initial positions each time the transducer 10 is de-energized. In addition to using a portion of the transducer driving force to counter the work load of providing a gain in output motion, a portion of the driving force will be used in overcoming the external force against the output bearing 33.

Figure 4:
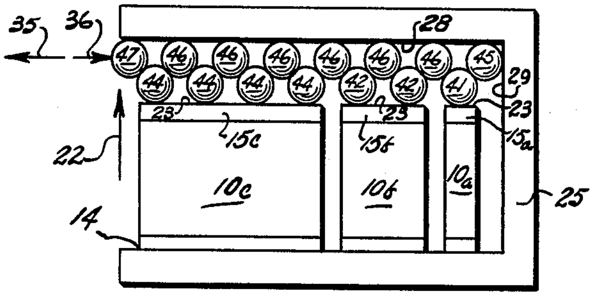
FIGURES 2, 4 and 5 are separate embodiments of the invention.

Referring now to another embodiment of the invention shown in FIGURE 4, several of the transducers 10*a*, 10*b* and 10*c* are utilized, each one being of the type described in conjunction with FIGURE 1, and supported in a stationary frame member 25 with their base 14 in a fixed position so that their associate output members 15*a*, 15*b* and 15*c* will be allowed to move in the direction of the arrow 22 when the units 10 are energized by the application of an electrical potential thereto. Their respective output members 15*a*, 15*b* and 15*c* have surfaces 23 which are normal to axial movements imparted to said members and the axial movements of the latter are parallel to one another. The stationary member 25 presents a surface parallel to the surfaces 15*a*, 15*b* and 15*c* and in an opposed spaced apart relation to the latter surfaces. Intermediate the latter surfaces and the surface 28 there is a series of bearings 41, 42, 44, 45, 46 and 47 adjoining one another in a side-by-side adjacency in a zig-zag arrangement. A single bearing 41 is also adjacent to the surface 23 of the member 15*a*; two bearings 42 are also adjacent the surface 23 of the member 15*b*; and four bearings 44 are also adjacent to the surface 23 of the member 15*c*. The remaining bearings 45, 46 and 47 are also adjacent to the surface 28 of the stationary member 25. The bearing 45 is also adjacent to the surface 29 of the latter member, and serves as a fixed reference bearing of the series.

When the units 10 are in de-energized conditions their respective output members 15 will be in what are termed as initial positions, and when the units 10 are in energized conditions the output members 15 will be in what are termed as their final positions. The zig-zag course of the series of bearings between the reference bearing 45 and the output bearing 47 may be altered subject to a variety of unit 10 control conditions, and each alteration will in turn affect the position of the output bearing 47 with respect to the reference bearing 45. There is a direct relationship, therefore, between the position of the output bearing 47, the zig-zag course of the series of bearings, and the respective positions of the output members 15.

An object of this embodiment is to control selectively the conversion of force to motion of a combination of piezoelectric transducers, but more importantly in response to input commands of binary coded signals. Signals applicable in this instance would consist of a 3-bit binary code, comprised of the digts 111. In an operational system the switching of potentials to the respective transducer units 10*a*, 10*b* and 10*c* would be carried out by well known binary-to-decimal code conversion circuit means, whereby a 3-bit code would command the distribution of potentials to the units 10*a*, 10*b* and 10*c*. The unit 10*a* would be energized upon the reception of code 001, unit 10*b* by code 010, and unit 10*c* by code 100. Since there is a single bearing 41 under the control of unit 10*a*, two bearings 42 under the control of unit 10*b*, and four bearings 44 under the control of unit 10*c*, the output bearing 47 will be made to assume seven different positions with respect to the reference bearing 45. An overall gain represented by the motion imparted to the output bearing 47 in comparison to motion imparted to the members 15*a*, 15*b* and 15*c* will be a function of system parameters considered in conjunction with the discussion of the embodiment of FIGURE 2.

Referring now to the other embodiment of the invention shown in FIGURE 5, several of the transducers 10*a*, 10*b* and 10*c* are utilized wherein each one is of the type described in connection with FIGURE 1. The transducers of this embodiment are supported in a stationary frame member 25 with their base 14 in a fixed position so that the output members of transducer units 10*a* and 10*b* will be allowed to move in a direction directly opposite to the output member of the transducer unit 10*c*. The output members 15*a* and 15*b* of their respective units 10*a* and 10*b* have surfaces 23 which are normal to axial movements imparted to said members 15*a* and 15*b*, and the axial movements of the latter are parallel to one another. The output member 15*c* of its respective unit 10*c* has a surface 23 which is normal to an axial movement imparted to said member 15*c*, and in the direction of the arrow 22 which is directly opposite to the movements imparted to the members 15*a* and 15*b*, as indicated by the arrow 22*a*.

The surfaces 23 of the output members 15*a* and 15*b* are supported in a spaced apart relationship to the opposing surface 23 of the output member 15*c*. Intermediate these opposing surfaces there is a series of bearings 41, 42, 44, 45 and 47 adjoining one another in a zig-zag side-by-side adjacency. A single bearing 41 is also adjacent to the surface 23 of the member 15*a*; two bearings 42 are also adjacent to the surface 23 of the member 15*b*; and four bearings 44 are also adjacent to the surface 23 of the member 15*c*. The bearing 45 is also adjacent to surfaces 28 and 29 of the stationary member 25, serving as a fixed reference bearing of the series. The bearing 47 is also adjacent to a surface 28*a* of the stationary member 25.

An object of this embodiment is to control selectively the conversion of force to motion of a combination of transducers, which is similar to the object explained in connection with the embodiment of FIGURE 4. Similarly, therefore, it is an object of this embodiment to convert force to motion in response to binary coded input signals.

Figure 5:
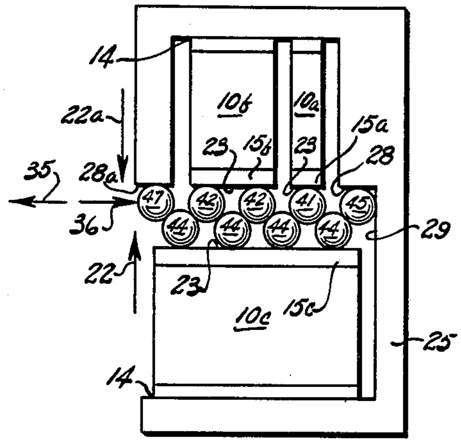

A chief difference in the embodiment of FIGURE 5 will be noted in the manner in which force and motion is imparted to the series of bearings in the assembly. Each of the bearings in the series are adjacent an active member 15, except the reference bearing 45 and the output bearing 47, which results in a system having slightly less than 50% fewer bearings than that required in the embodiment of FIGURE 4. This may be a considerable advantage in applications of the invention requiring motion gains of several orders of magnitude. This advantage may also be utilized in the embodiment of FIGURE 1, wherein the sole objective is that of converting force to motion. In this case a pair of oppositely positioned transducer units 10 would be operated in parallel.

The particular embodiments of the invention illustrated and described herein are illustrative only, and the invention includes such other modifications and equivalents as may readily occur to those skilled in the art, within the scope of the appended claims.

I claim:

1. A converter which is designed to amplify the output motion of a piezoelectric transducer comprising: a piezoelectric transducer having an output member associated therewith; means for imparting force and motion to said output member in response to the application of an electrical potential to said transducer; said output member presenting a surface normal to an axial motion imparted thereto; a stationary member; said stationary member presenting a surface normal to said axial motion imparted to said output member and being supported in a spaced apart relationship to the surface of said output member; a reference bearing surface; a series of bearings being adjoined to one another in a zig-zag side-by-side adjacency having a fixed position bearing at one end of said series and an output bearing at the opposite end of said series; a plurality of bearings on one side of said series being adjoined to the surface of said output member; a plurality of bearings on the opposite side of said series being adjoined to the surface of said stationary member; said fixed position bearing being adjoined to said reference bearing surface; means for imparting force and motion to said plurality of bearings on said one side of said series upon the impartment of force and motion to said output member; and means for deriving from said output bearing an amplification of the motion imparted to said output member.

2. A converter which is designed to amplify the output motion of a transducer means comprising:

(*a*) said transducer means having an output member associated therewith;
(*b*) means for imparting force and motion to said output member from said transducer means;
(*c*) said output member presenting a surface normal to an axial motion imparted thereto;
(*d*) a stationary member;
(*e*) said stationary member presenting a surface normal to said motion imparted to said output member and being supported in a spaced apart relationship to the surface of said output member;
(*f*) a reference bearing surface;
(*g*) a series of bearings being adjoined to one another in a zig-zag side-by-side adjacency having a bearing at one end of said series adjoined to said reference bearing surface and an output bearing at the opposite end of said series;
(*h*) a plurality of bearings on one side of said series being adjoined to the surface of said output member and said surface being provided with a way along which said bearings will be adapted to slide;
(*i*) a plurality of bearings on the opposite side of said series being adjoined to the surface of said stationary member and said surface being provided with a way along which said bearings will be adapted to slide;
(*j*) means for imparting force and motion to said plurality of bearings on said one side of said series upon the impartment of force and motion to said output member; and
(*k*) means for deriving from said output bearing an amplification of the motion imparted to said output member.

3. A converter which is designed to amplify the output motion of a plurality of transducer means comprising:

(*a*) said transducer means each having an output member associated therewith;
(*b*) means for imparting force and motion, respectively, from each of said transducer means to the output member in association therewith;
(*c*) said output member of each transducer means presenting a surface normal to an axial motion imparted thereto;
(*d*) a stationary member;
(*e*) said stationary member presenting a surface normal to said motion imparted to said output members and being supported in a spaced apart relationship to the surface of each of said output members;
(*f*) a reference bearing surface;
(*g*) a series of bearings being adjoined to one another in a zig-zag side-by-side adjacency having a bearing at one end of said series adjoined to said reference bearing surface and an output bearing at the opposite end of said series;
(*h*) a plurality of bearings on one side of said series being adjoined to the surfaces of said output members and each of said surfaces being provided with a way along which said bearings will be adapted to slide;
(*i*) a plurality of bearings on the opposite side of said series being adjoined to the surface of said stationary member and said surface being provided with a way along which said bearings will be adapted to slide;

(j) means for imparting force and motion to said plurality of bearings on said one side of said series upon the impartment of force and motion to said output members; and (k) means for deriving from said output bearing an amplification of the motion imparted to said output members.

References Cited in the file of this patent

UNITED STATES PATENTS

| | | |
|---|---|---|
| 2,077,962 | Smith | Apr. 20, 1937 |
| 2,864,013 | Wood | Dec. 9, 1958 |

FOREIGN PATENTS

| | | |
|---|---|---|
| 1,076,422 | France | Apr. 21, 1954 |